United States Patent [19]

Gaonkar

[11] Patent Number: 5,322,704
[45] Date of Patent: Jun. 21, 1994

[54] METHOD FOR PREPARING A MULTIPLE EMULSION

[75] Inventor: Anilkumar G. Gaonkar, Vernon Hills, Ill.

[73] Assignee: Kraft General Foods, Inc., Northfield, Ill.

[21] Appl. No.: 951,098

[22] Filed: Sep. 25, 1992

[51] Int. Cl.$^5$ .............................................. A23D 7/00
[52] U.S. Cl. ............................ 426/601; 426/602; 426/607; 252/314; 252/312; 514/938
[58] Field of Search .................. 426/601, 602, 650; 252/312, 314; 514/938

[56] References Cited

U.S. PATENT DOCUMENTS

| | | | |
|---|---|---|---|
| 4,590,086 | 5/1986 | Takahashi | 426/602 |
| 4,626,443 | 12/1986 | Takahashi | 426/602 |
| 4,626,444 | 12/1986 | Takahashi | 426/602 |
| 4,632,840 | 12/1986 | Takahashi | 426/602 |
| 4,714,566 | 12/1987 | Takahashi | 426/602 |
| 4,908,154 | 3/1990 | Cook | 426/650 |
| 4,931,210 | 6/1990 | Takahashi | 426/602 |
| 4,933,192 | 6/1990 | Darling | 426/602 |
| 4,944,956 | 7/1990 | Brun | 426/592 |
| 4,971,721 | 11/1990 | Takahashi | 426/602 |
| 4,985,173 | 1/1991 | Takahashi | 426/602 |
| 4,988,456 | 1/1991 | Takahashi | 426/602 |
| 5,045,337 | 9/1991 | El-Nokaly | 426/602 |
| 5,139,803 | 8/1992 | Haynes | 426/602 |

FOREIGN PATENT DOCUMENTS

| | | | |
|---|---|---|---|
| 261956 | 11/1988 | Fed. Rep. of Germany | 426/602 |
| 63-44936 | 2/1988 | Japan | 426/602 |
| 3-127952 | 5/1991 | Japan | 426/601 |

OTHER PUBLICATIONS

Pilman et al., "Inverse Micellar Phases in Ternary Systems of Polar Lipids/Fat/Water and Protein Emulsification of Such Phases To W/O/W–Microemulsion–Emulsions," *J. Dispersion Science and Technology*, 1(3), 267–281 (1980).

*Primary Examiner*—Carolyn Paden
*Attorney, Agent, or Firm*—Fitch, Even, Tabin & Flannery

[57] ABSTRACT

The present invention is directed to a method for preparing a W/0/W multiple emulsion by a greatly simplified, unique procedure. In the method, a mixture of oil, water, a second alkyl containing polar, protic solvent and a hydrophilic emulsifier is provided. This mixture breaks down the oil into extremely small droplets which in effect results in the solution of the oil in the mixture. This mixture containing extremely small droplets of oil is referred to herein as a "microemulsion". The 0/W microemulsion is then diluted with sufficient water to cause destabilization of the microemulsion and to provide a W/0/W multiple emulsion.

6 Claims, No Drawings

METHOD FOR PREPARING A MULTIPLE EMULSION

FIELD OF THE INVENTION

The present invention is related to water-in-oil-in-water (W/O/W) multiple emulsions. More particularly, the present invention relates to W/0/W multiple emulsions which are produced by a unique, greatly simplified process.

BACKGROUND OF THE INVENTION

Emulsions, in general, are heterogeneous systems of one immiscible liquid dispersed in another in the form of droplets which usually have a diameter greater than 1 micron. The two liquids are chemically unreactive and form systems characterized by a low thermodynamic stability. Simple emulsions are classified according to the nature of their continuous and dispersed phase. It is the custom to set forth the droplet (dispersed) phase first followed by the continuous phase separated by a / mark, i.e., either water(droplets)-in-oil(continuous) (W/O) or oil-in-water (O/W) emulsions. Multiple emulsions are characterized by listing the primary emulsion set first which is dispersed in a continuous phase. For example, in a water-in-oil-in-water (W/O/W) multiple emulsion, a W/O primary emulsion is dispersed in a water continuous phase. An emulsifier is present to stabilize the emulsion and a variety of ionic and nonionic surfactants are available for this purpose. Lipophilic (oil-soluble, low HLB) surfactants are used to stabilize W/O emulsions, whereas hydrophilic (water-soluble, high HLB) surfactants are used to stabilize oil/water systems.

Multiple emulsions are more complex systems as the drops of the dispersed phase themselves contain even smaller dispersed droplets which normally consist of a liquid which is miscible, and in most cases, is identical with the continuous phase. They are therefore, emulsions of emulsions. For each type of multiple emulsion, the internal and external phases are alike and an intermediate phase separates the two like phases. The intermediate phase is immiscible with the two like phases.

Multiple emulsions are usually prepared by a two-stage procedure; Matsumoto, et al., *J. Colloid Interference Sci.*, 57-353-361 (1976). The first stage involves the preparation of a primary emulsion, which, in the preparation of a W/O/W emulsion, is a W/O emulsion. In the second step, the primary emulsion is further emulsified in water containing a hydrophilic emulsifier to form the multiple emulsion. The primary emulsion may be prepared in any suitable manner; for example, with a laboratory mixer, by ultrasonification, etc. A lipophilic surfactant is used to promote the formation of a W/O emulsion. This emulsion is then poured into a solution or a dispersion of a hydrophilic surfactant in water. The hydrophilic surfactant is used to promote O/W emulsification in which the "oil" phase is the W/O emulsion.

The second emulsification step is critical and sometimes extremely difficult to effect as excess mixing can fracture the drops of the primary emulsion, resulting in a simple O/W emulsion. The internal water droplets are lost and mixed with the external aqueous phase as the oil drops are torn apart. For this reason, high shear mixers and sonification are unsuitable methods for preparation of the second emulsion. A small, low-shear mixing may be employed or the mixture may be shaken by hand. However, no matter what emulsification method is used for the second step, some of the internal aqueous phase is unavoidably lost to the external aqueous phase.

With respect to food technology, considerable research effort has been expended on developing reduced fat food products which have low oil content, particularly aqueous based products which have low or substantially no fat content. Significant advances have been made in reducing fat and oil content of various food products through the use of, for example, water-in-oil emulsions or water-in-oil-in-water emulsions, wherein water occupies volume which otherwise would have been occupied with oil, thereby commensurately reducing the amount of oil in an oil-containing food product. For example, Takahashi, et al., U.S. Pat. Nos. 4,632,840, 4,626,443 and 4,626,444 disclose reduced fat salad dressing having a W/O/W emulsion base. Such salad dressings nevertheless still have about 30% oil by weight. Further fat reductions have been obtained using, as fat mimetics, novel carbohydrate-protein complexes such as those disclosed in U.S. Pat. No. 5,104,674 or microreticulated microcrystalline cellulose as disclosed in co-owned U. S. Pat. No. 5,011,701, filed Aug. 18, 1989. Such carbohydrate-protein complexes or microreticulated microcrystalline cellulose are particularly useful in providing no-fat food products such as viscous and pourable salad dressings and the like having fat-like organoleptic characteristics.

While elimination or substantial reduction of oil content is attainable, such low-fat or no-fat products characteristically lack (or lose during storage) the desirable flavor possessed by their high-fat counterparts. Stabilization of aqueous-soluble or lipid-soluble flavors in low- or no-fat, aqueous based food products has not received much attention. Heretofore, aqueous soluble flavors have merely been added along with other aqueous soluble ingredients to produce low- or no-fat food products; with respect to reintroducing fat-soluble flavors to reduced-fat products. PCT International Application No. WO90/00354 to Singer discloses adding to low-fat and no-fat foods, fat globules containing concentrated fat soluble flavoring to simulate the organoleptic effect of fat-rich food products. In each of these cases, the flavors are in contact with the aqueous based food vehicle environment (either directly or at the interface between the fat globules and the aqueous base of the food vehicle) and thereby may be adversely affected. Flavor perception in low- or no-fat food products containing soluble flavors simply mixed into the aqueous-based food vehicle, e.g., viscous or pourable salad dressings or the like, rapidly deteriorates; presumably due to interaction of flavors with the aqueous base, giving such products a short shelf life. It would therefore be desirable to provide aqueous based food products (especially no-fat products) which have aqueous or oil soluble flavor components stably maintained so as to protect the flavors from volatilization, oxidation and other desirable events, during extended storage, while at the same time providing for ready release of such flavors, with good organoleptic characteristics, when such low/no-fat food products are eaten.

In view of the above, it is an object of the present invention to provide stable W/O/W multiple emulsions which utilize reduced amounts of emulsifiers, which multiple emulsions are suitable for food emulsion technology, as well as other applications utilizing multiple emulsions. It is also an object of the present invention to provide flavor delivering compositions which are stably maintained in low-fat or no-fat products, such that the flavors are protected from the aqueous based food vehicle environment until the food product is eaten, whereupon the flavor is readily released to yield a desirable taste perception and mouthfeel. These and other objects of the invention will become apparent from the following detailed description.

SUMMARY OF THE INVENTION

The present invention is directed to a method for preparing a W/O/W multiple emulsion by a greatly simplified, unique procedure. In the method, a mixture of oil, water, a second alkyl containing polar, protic solvent and a hydrophilic emulsifier is provided. This mixture breaks down the oil into extremely small droplets which in effect results in the solution of the oil in the mixture. This mixture containing extremely small droplets of oil is referred to herein as a "microemulsion". The O/W microemulsion is then diluted with sufficient water to cause destabilization of the microemulsion and to provide a W/O/W multiple emulsion.

DETAILED DESCRIPTION OF THE INVENTION

The present invention provides an extremely simple method for preparing W/O/W multiple emulsions which method does not require any mixing steps and does not require the use of a lipophilic emulsifier.

As used herein, the term "oil" for use in the W/O/W multiple emulsions of the invention include non-miscible fluid substances which are utilized in the food industry for flavoring purposes as well as mixtures of such non-miscible fluid substances with traditional triglyceride oils, such as the vegetable oils. Such non-miscible food flavoring substances include esters, such as gamma-decalactone, delta-decalactone, aldehydes, such as benzaldehyde and mixtures of aldehydes, ketones and esters which are used for particular food flavoring purposes, such as a butter flavor, cheese flavor and fruit flavor. Since some of the oil is replaced by a water phase in a W/O/W multiple emulsion, it becomes possible to obtain a greater impact of the flavor using a smaller amount of the flavor oil.

It is also possible to add water-soluble flavors to the water used in the preparation of the O/W microemulsion and/or in the water used in the dilution of the microemulsion to yield the W/O/W multiple emulsion. As mentioned earlier, no matter what emulsification method is used in the preparation of the W/O/W multiple emulsion, some of the internal aqueous phase is unavoidably lost to the external phase. This is not particularly undesirable because a sudden impact of the flavor could be obtained from the flavors in the external phase and a more prolonged delivery from the flavors in the internal aqueous phase.

In accordance with the method of the invention, a mixture of oil, water, a polar, protic, solvent having at least 1 alkyl group and a hydrophilic emulsifier is provided. The mixture is prepared by simply combining the components of the mixture in a suitable container. Use of a mixer is not required. After combining the components in the container, the oil spontaneously divides into submicron sized particles in the solvent phase to form an O/W microemulsion. The size of the oil particles in the solvent phase is approximately 0.02 microns.

It is an important aspect of the present invention that the hydrophilic emulsifier be present at a very low level. In general, the hydrophilic emulsifier will be present at a level of from about 0.5% to about 5%, although levels of up to about 10% may be used with some hydrophilic emulsifiers. All percentages used herein are by weight unless otherwise indicated. Any of the well known hydrophilic emulsifiers used to make oil/water emulsions can be used, such as polyoxyethylene (20) sorbitan monooleate (Tween 80), polyoxyethylene (20) sorbitan monostearate (Tween 60) polyglycerol esters of fatty acids and sugar esters. It is a further significant aspect of the invention that the starting point for the manufacture of the W/O/W multiple emulsions is O/W emulsion. As previously discussed, the conventional starting point for preparation of a W/O/W emulsion is a primary W/O emulsion. The W/O emulsion is then converted to a W/O/W emulsion in a continuous water phase by adding the W/O emulsion to water with gentle mixing.

The microemulsion contains oil at a level of from about 5% to about 50%. Water is present in the microemulsion at a level of from about 5% to about 50%, the polar, protic water miscible solvent having at least 1 alkyl group is present at a level of from about 30% to about 65% and the hydrophilic emulsifier is present at a level of from about 0.5% to about 10%.

Protic solvents are solvents containing hydrogen that is attached to oxygen or nitrogen. Protic solvents solvate cations through unshared pairs and anions through hydrogen bonding. Water, of course, is the most universally used polar, protic solvent. Suitable protic solvents for use in the present invention include the lower alkyl alcohols, such as methanol, ethanol and propanol and a mixture of such lower alkyl alcohols and higher alkyl alcohols which have a bland flavor and are soluble in the lower alkyl alcohols, such as dodecanol. Other suitable alkyl containing protic solvents useful in the present invention include glycerol and propylene glycol.

After the O/W microemulsion is formed by combining the components of the microemulsion into a mixture, the mixture is converted to a W/O/W emulsion. The conversion is made by simply diluting the O/W microemulsion with additional water. No mixing is required. The dilution with water causes a phase change from an O/W microemulsion to a W/O/W multiple emulsion. While not wishing to be bound by any theory, it is believed that the phase change is due to the reduction in the concentration of the hydrophilic emulsifier at the oil/water interface, and the reduction of the concentration of the alkyl containing protic solvent. In this connection, the method of the present invention cannot be used to prepare W/O/W multiple emulsions if the hydrophilic emulsifier level or the alkyl-containing protic solvent level is too high in the microemulsion. A practical upper limit for the hydrophilic emulsifier is about 10% and the practical upper limit for the alkyl-containing protic solvent is about 65%. If either the hydrophilic emulsifier is above about 10% or the alkyl-containing proctic solvent is above about 65% in the microemulsion, a W/O/W multiple emulsion cannot be made by the method of the present invention. The dilution of the O/W microemulsion with water to form a W/O/W emulsion takes place at a ratio of water to microemulsion of from about 1:1 to about 100:1.

The following examples further illustrate various features of the invention, but are intended to in no way limit the scope of the invention as set forth in the appended claims.

EXAMPLE 1

Various flavor oils were used to prepare microemulsions having the formulations set forth in Table 1.

TABLE 1

| Example 1 | | | Example 2 | | | Example 3 | | | Example 4 | | |
|---|---|---|---|---|---|---|---|---|---|---|---|
| % | Wt. | Ingredient | % | Wt. | Ingredient | % | Wt. | Ingredient | % | Wt. | Ingredient |
| 11.50 | 0.5 g | γ-decalactone | 17.13 | 0.5 g | Butter Flavor | 20.40 | 0.51 g | Cheese flavor | 20.00 | 0.50 g | Art But flav* |
| 1.15 | 0.05 g | Tween 80 | 4.11 | 0.12 g | Tween 80 | 4.40 | 0.11 g | Tween 80 | 4.00 | 0.10 g | Tween 80 |
| 48.28 | 2.1 g | Water | 17.12 | 0.5 g | Water | 28.80 | 0.72 g | Water | 20.00 | 0.50 g | Water |
| 39.02 | 1.7 g | Ethanol | 44.52 | 1.3 g | Ethanol | 29.60 | 0.74 g | Ethanol | 40.00 | 1.0 g | Ethanol |
| Totals | | | 17.12 | 0.5 g | Dodecanol | 16.80 | 0.42 g | Dodecanol | 16.00 | 0.40 g | Dodecanol |
| 100.00 | 4.35 | | 100.00 | 2.92 g | | 100.00 | 2.5 g | | 100.00 | 2.50 g | |

| Example 5 | | | Example 6 | | | Example 7 | | | Example 8 | | |
|---|---|---|---|---|---|---|---|---|---|---|---|
| % | Wt. | Ingredient | % | Wt. | Ingredient | % | Wt. | Ingredient | % | Wt. | Ingredient |
| 42.01 | 1.0 g | Art But flav* | 12.34 | 0.50 g | Benzaldehyde | 20.08 | 1.04 g | δ-dodecalactone | 8.33 | 0.25 g | Art But flav* |
| 4.20 | 0.10 g | Tween 80 | 1.23 | 0.05 g | Tween 80 | 1.92 | 0.10 g | Tween 80 | 8.33 | 0.25 g | Neobee Oil** |
| 8.40 | 2.0 g | Water | 49.38 | 2.00 g | Water | 39.00 | 2.02 g | Water | 3.33 | 0.10 g | Tween 80 |
| 28.58 | 0.68 g | Ethanol | 37.05 | 1.50 g | Ethanol | 39.00 | 2.02 | Ethanol | 16.67 | 0.50 g | Water |
| 16.81 | 0.40 g | Dodecanol | | | | | | | 50.00 | 1.50 g | Ethanol |
| Totals | | | | | | | | | 13.34 | 0.40 g | Dodecanol |
| 100.00 | 2.38 | | 100.00 | 4.05 g | | 100.00 | 5.18 g | | 100.00 | 2.00 g | |

| Example 9 | | | Example 10 | | |
|---|---|---|---|---|---|
| % | Wt. | Ingredient | % | Wt. | Ingredient |
| 11.76 | 0.30 g | δ-dodecalactone | 20.24 | 0.50 g | Art But flav* |
| 9.80 | 0.25 g | Neobee Oil** | 4.05 | 0.10 g | Tween 60 |
| 3.92 | 0.10 g | Tween 80 | 20.24 | 0.50 g | Water |
| 22.35 | 0.57 g | Water | 16.19 | 0.40 g | Dodecanol |
| 35.30 | 0.90 g | Ethanol | 39.28 | 0.97 g | Ethanol |
| 16.87 | 0.43 g | Dodecanol | | | |
| Totals | | | | | |
| 100.00 | 2.55 g | | 100.00 | 2.47 g | |

*Art But flav = Artificial butter flavor 586-6041/AH from Firmenich
**Neobee Oil = medium chain triglyceride oil The formulations of Table 1 were prepared by simply adding the components of each formulation to a beaker. A microemulsion of the oil was formed after the components were combined. The O/W microemulsion was converted to a W/O/W multiple emulsion upon diluting the microemulsion with 1-100 parts of water, based on the total weight of the microemulsion. Both type A and type B multiple drops of water in the internal water phase were formed. The oil droplets of the internal oil phase were about 2-100 microns, average size, depending on the system.

A further group of microemulsions were prepared having the components set forth in Table 2.

Upon dilution of the microemulsions of Table 2 with water, no W/O/W multiple emulsions were formed.

Conversion of a microemulsion to a multiple emulsion is possible only at the low concentrations of hydrophilic emulsifier and alkyl-containing protic solvents set forth above. It appears that the conversion of an O/W microemulsion is possible only when the microemulsion has border-line stability. This is highly desirable since the multiple emulsion can be prepared using very low levels of the hydrophilic emulsifier. The use of low levels of hydrophilic emulsifier is desirable both from a cost and an off flavor standpoint when the W/O/W emulsions are used in a food product.

What is claimed is:

1. A method for preparing a W/O/W multiple emulsion comprising the steps of;

TABLE 2

| Example 1A | | | Example 2A | | | Example 3A | | | Example 4A | | |
|---|---|---|---|---|---|---|---|---|---|---|---|
| % | Wt. | Ingredient | % | Wt. | Ingredient | % | Wt. | Ingredient | % | Wt. | Ingredient |
| 7.94 | 0.5 g | γ-decalactone | 10.64 | 0.5 g | Butter Flavor | 7.12 | 0.5 g | Butter Flavor | 18.73 | 0.50 g | Cheese flavor |
| 31.75 | 2.0 g | Tween 80 | 10.64 | 0.5 g | Tween 80 | 1.71 | 0.12 g | Tween 80 | 18.73 | 0.50 g | Tween 80 |
| 47.61 | 3.0 g | Water | 10.64 | 0.5 g | Water | 8.55 | 0.6 g | Water | 28.08 | 0.75 g | Water |
| 12.70 | 0.8 g | Ethanol | 66.18 | 3.2 g | Ethanol | 82.62 | 5.8 g | Ethanol | 18.73 | 0.50 g | Ethanol |
| Totals | | | | | | | | | 15.73 | 0.42 g | Dodecanol |
| 100.00 | 6.3 g | | 100.00 | 4.7 g | | 100.00 | 7.02 g | | 100.00 | 2.67 g | |

| Example 5A | | | Example 6A | | | Example 7A | | |
|---|---|---|---|---|---|---|---|---|
| % | Wt. | Ingredient | % | Wt. | Ingredient | % | Wt. | Ingredient |
| 22.22 | 0.50 g | Art But flav* | 13.10 | 0.50 g | Art But Flav* | 12.59 | 0.50 g | Art But flav* |
| 22.22 | 0.50 g | Tween 80 | 13.60 | 0.52 g | Tween 80 | 2.53 | 0.10 g | Tween 80 |
| 22.22 | 0.50 g | Water | 13.10 | 0.50 g | Water | 12.59 | 0.50 g | Water |
| 15.56 | 0.35 g | Ethanol | 60.20 | 2.30 g | Ethanol | 72.29 | 2.87 g | Ethanol |
| 17.78 | 0.40 g | Dodecanol | | | | | | |
| Totals | | | | | | | | |
| 100.00 | 2.25 g | | 100.00 | 3.82 g | | 100.00 | 3.97 g | |

*Art But flav = Artifical butter flavor 586-6041/AH from Firmenich
**Neobee Oil = medium chain triglyceride oil (a) providing a mixture of oil, water, an alkyl containing polar, protic solvent and a hydrophilic emulsifier so as to form an O/W microemulsion; and (b) diluting said microemulsion with sufficient water to cause destabilization of said O/W microemulsion to provide a W/O/W multiple emulsion; said microemulsion containing oil at a level of from about 5 to about 50%, alkyl containing polar, protic solvent at a level of from about 30% to about 65%, water at a level of from about 5% to about 50% and hydrophilic emulsifier at a level of from about 0.5% to about 10%.

2. A method in accordance with claim 1 wherein said alkyl containing polar, protic solvent is selected from the group consisting of methanol, ethanol, propanol, glycerol, propylene glycol, dodecanol and mixtures thereof.

3. A method in accordance with claim 2 wherein said alkyl containing polar, protic solvent is ethanol and mixtures of ethanol and dodecanol.

4. A method in accordance with claim 1 wherein said oil is selected from the group consisting of non-miscible fluid flavoring materials and mixtures of non-miscible fluid flavoring materials with vegetable oils.

5. A method in accordance with claim 1 wherein said dilution of said microemulsion with water is at a ratio of water to microemulsion of from about 1:1 to about 100:1.

6. A method in accordance with claim 1 wherein said hydrophilic emulsifier is selected from the group consisting of polyoxyethylene (20) sorbitan monooleate (Tween 80), polyoxyethylene (20) sorbitan monostearate (Tween 60), polyglycerol esters of fatty acids and sugar esters.

* * * * *